(12) United States Patent
Raghavan

(10) Patent No.: US 11,747,434 B2
(45) Date of Patent: Sep. 5, 2023

(54) ROBUST CONSTANT FALSE ALARM RATE (CFAR) DETECTOR FOR INTERFERENCE-PLUS-NOISE COVARIANCE MATRIX MISMATCH

(71) Applicant: US Gov't as represented by Secretary of Air Force, Wright-Patterson AFB, OH (US)

(72) Inventor: Ramachandran S. Raghavan, Centerville, OH (US)

(73) Assignee: United States of America as represented by the Secretary of the Air Force, Wright-Patterson AFB, OH (US)

( * ) Notice: Subject to any disclaimer, the term of this patent is extended or adjusted under 35 U.S.C. 154(b) by 283 days.

(21) Appl. No.: 17/211,253

(22) Filed: Mar. 24, 2021

(65) Prior Publication Data

US 2021/0208270 A1    Jul. 8, 2021

Related U.S. Application Data

(62) Division of application No. 16/267,739, filed on Feb. 5, 2019, now abandoned.

(60) Provisional application No. 62/743,664, filed on Oct. 10, 2018.

(51) Int. Cl.
*G01S 7/02* (2006.01)
*G01S 13/524* (2006.01)
*G01S 7/41* (2006.01)

(52) U.S. Cl.
CPC .............. *G01S 7/023* (2013.01); *G01S 7/414* (2013.01); *G01S 13/5246* (2013.01)

(58) Field of Classification Search
CPC ....... G01S 7/023; G01S 7/414; G01S 13/5246
See application file for complete search history.

(56) References Cited

U.S. PATENT DOCUMENTS 5,706,013 A * 1/1998 Melvin ................ G06V 10/255
                                                            346/16
9,746,549 B1 * 8/2017 Parker ..................... G01S 7/292

\* cited by examiner

*Primary Examiner* — Matthew M Barker
(74) *Attorney, Agent, or Firm* — AFMCLO/JAZ; Jeffrey R. Moore

(57) ABSTRACT

Detection of a radar target from a received radar signal includes computing a vector of filter weights dependent upon a steering vector and determining a threshold value dependent upon a designated probability of false alarm. The vector of filter weights is applied to samples of the received radar signal at a test cell, corresponding to a test range, to provide a filtered test signal and a test power of the filtered test signal is computed. The weights are also applied to samples of the received radar signal at a number of reference cells, to produce filtered reference signals. A reference power is computed from the filtered reference signals and the radar target is detected at the test range when a ratio of the test power to the reference power exceeds the threshold value.

8 Claims, 4 Drawing Sheets

ROBUST CONSTANT FALSE ALARM RATE (CFAR) DETECTOR FOR INTERFERENCE-PLUS-NOISE COVARIANCE MATRIX MISMATCH

PRIORITY CLAIM

This application is a divisional patent application of U.S. patent application Ser. No. 16/267,739 entitled "Robust False Constant Alarm Rate (CFAR) Detector for Interference-plus-noise Covariance Matrix Mismatch", filed on 5 Feb. 2019, which in turn claims the benefit of priority under 35 U.S.C. § 119(e) to U.S. Provisional Application Ser. No. 62/743,664 entitled "Robust False Constant Alarm Rate (CFAR) Detector for Interference-plus-noise Covariance Matrix Mismatch", filed on 10 Oct. 2018, the contents of both of which are incorporated herein by reference in their entirety.

STATEMENT OF GOVERNMENT INTEREST

The invention described herein may be manufactured, used, and licensed by or for the Government of the United States for all governmental purposes without the payment of any royalty.

BACKGROUND

Detection of a signal of interest in a received signal, such as a radar echo from a target, is made more difficult by the presence of interference (such a clutter) and noise in the received signal. The received signal down-converted to a baseband, sampled and time gated to provide a test vector. Cancelation or minimization of interference in the test vector may be performed prior to detecting an additive signal of interest in coherent radar applications. The received samples in the test vector can generally be multi-dimensional, involving combinations of slow time samples, samples from spatially separated transmit/receive elements, transmit/receive polarization, different frequency bands etc. Cancelation of interference in the test vector may utilize knowledge of the covariance matrix of the interference-plus-noise. Since the interference-plus-noise may be time varying, cancellation of the interference may use adaptive weights that are subject to gain constraints that prevent the desired signal from being canceled are computed from the interference-plus-noise covariance matrix.

However, the interference-plus-noise covariance matrix of the test vector is generally unknown and estimates must be obtained from models and/or from training vector samples of interference and noise.

Many prior adaptive algorithms for the detection of a signal in unknown interference are based on the availability of a set of signal-free training vectors that have the same characteristics as the interference and noise in the test vector. Algorithms are generally designed to have a Constant False Alarm Rate (CFAR) characteristic so that a detector can set a preset threshold to achieve a desired probability of false alarm without knowing the interference-plus-noise covariance matrix. The control of false alarms prevents receivers from being overwhelmed by incorrect detections (i.e. false alarms). However, the CFAR property of algorithms breaks down when the interference-plus-noise covariance matrices of the test vector and that of the training vectors are mismatched. Accordingly, there is a need for a detection approach that is robust in the presence of mismatch between the covariance matrix of training vectors and the covariance matrix of the test vector.

BRIEF DESCRIPTION OF THE DRAWINGS

The accompanying drawings provide visual representations which will be used to more fully describe various representative embodiments and can be used by those skilled in the art to better understand the representative embodiments disclosed and their inherent advantages. The drawings are not necessarily to scale, emphasis instead being placed upon illustrating the principles of the devices, systems, and methods described herein. In these drawings, like reference numerals may identify corresponding elements.

DETAILED DESCRIPTION

Figure 1:
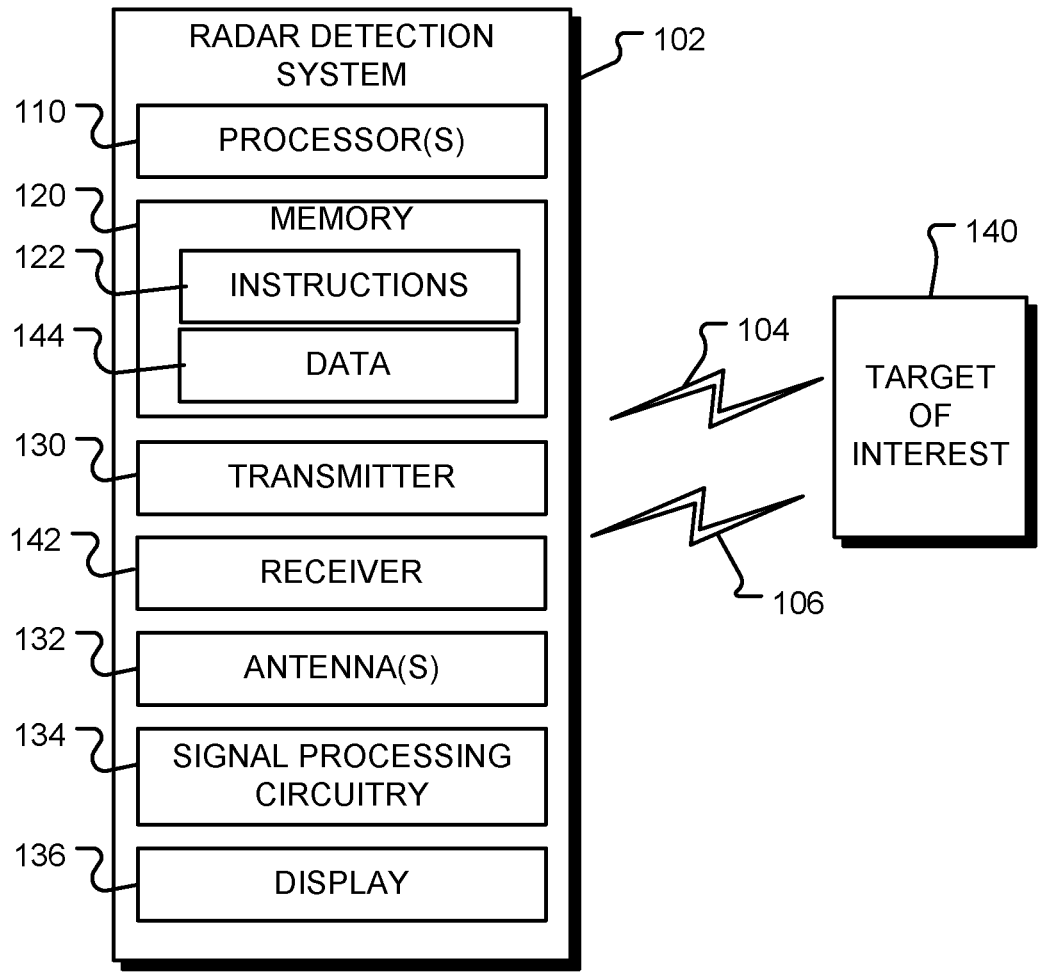
FIG. 1 illustrates a radar detection system, in accordance with a representative embodiment.

The various methods, systems, apparatuses, and devices described herein generally provide methods and apparatus for radar detection.

While this invention is susceptible of being embodied in many different forms, there is shown in the drawings and will herein be described in detail specific embodiments, with the understanding that the present disclosure is to be considered as an example of the principles of the invention and not intended to limit the invention to the specific embodiments shown and described. In the description below, like reference numerals may be used to describe the same, similar or corresponding parts in the several views of the drawings.

In this document, relational terms such as first and second, top and bottom, and the like may be used solely to distinguish one entity or action from another entity or action without necessarily requiring or implying any actual such relationship or order between such entities or actions. The terms "comprises," "comprising," "includes," "including," "has," "having," or any other variations thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

Reference throughout this document to "one embodiment," "certain embodiments," "an embodiment," "implementation(s)," "aspect(s)," or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C." An exception to this definition will occur only when a combination of elements, functions, steps or acts are in some way inherently mutually exclusive. Also, grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth.

All documents mentioned herein are hereby incorporated by reference in their entirety. References to items in the singular should be understood to include items in the plural, and vice versa, unless explicitly stated otherwise or clear from the text.

Recitation of ranges of values herein are not intended to be limiting, referring instead individually to any and all values falling within the range, unless otherwise indicated, and each separate value within such a range is incorporated into the specification as if it were individually recited herein. The words "about," "approximately," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples, or exemplary language ("e.g.," "such as," or the like) provided herein, is intended merely to better illuminate the embodiments and does not pose a limitation on the scope of the embodiments. No language in the specification should be construed as indicating any unclaimed element as essential to the practice of the embodiments.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

In the following description, it is understood that terms such as "first," "second," "top," "bottom," "up," "down," "above," "below," and the like, are words of convenience and are not to be construed as limiting terms. Also, the terms apparatus and device may be used interchangeably in this text.

Detecting a radar target in unknown interference and noise generally requires an estimate of the interference plus noise covariance matrix. This enables interference to be suppressed in a received test vector and the hypothesized signal (if present) is detectable above the interference. Surveillance applications, which involve the testing the received data from large numbers of cells corresponding to different ranges and Doppler shifts, require the control of the probability of false alarm so that radar receivers are not overwhelmed by too many false detections (i.e. false alarms). In order to determine the interference plus noise covariance matrix, secondary vectors are required for each range/Doppler cell to be tested for a hypothesized signal. The secondary vectors are required to contain only interference and noise (i.e. no signal) and to share the same covariance matrix as the interference and noise in the test cell. These conditions can be too restrictive in practice. Similar restrictions apply to other implementations of Space-Time Adaptive Processing.

In general, the devices, systems, and methods described herein provide for radar detection of targets, where the detection has a constant probability of false alarm even when an estimated covariance matrix used for suppressing interference and noise is mismatched with a covariance matrix of a test vector. In particular, the disclosed approach relaxes the requirement for an exact covariance matrix match between the interference and noise in the test cell and the interference and noise in the secondary cells (referred to as training cells in this disclosure). A signal transformation matrix, which may be an estimate of the covariance matrix of interference and noise of the training, is computed once, or infrequently, and the same matrix may be used to suppress interference in multiple test cells. As a consequence of the mismatch, residual interference remains in the post-interference suppressed output of a test cell. Since the interference itself is unknown, the residual interference is also unknown. In order to achieve constant false alarm rate (CFAR) performance under conditions of mismatch, a relatively small number of reference cells (compared to the number of reference cells required to provide an accurate estimate the covariance matrix) are required. The reference cells enable a comparison between the residual interference power in the test cell and the residual interference power in the reference cells.

When the interference plus noise covariance matrix of the test cell is matched with that of the reference cells, comparison of residual interference can achieve CFAR performance for the detector. The probability of having a relatively small number of reference cells whose interference is matched with that of the test cell is generally high in comparison to the probability of finding a large number of secondary cells whose interference is matched to that of the test cell.

The detection performance of the detector is defined by the level of mismatch between the interference-plus-noise covariance matrices of the test cell and the training cells. The detection performance disclosed herein may be used to define a performance-based metric for computing mismatch between two covariance matrices rather than the commonly used metric of Frebonius norm of the covariance matrix difference. In general, the Frebonius norm of the difference matrix does not provide an indicator of performance.

Appendix A, titled 'Analysis of Mismatched Training on False Alarm Control of AMF Algorithm' is hereby incorporated by reference herein and provides an analysis of the effects of matrix mismatch on detection using an adaptive matched filter (AMF) approach.

Appendix B, titled 'Effects of Mismatched Training on Adaptive Detection' is also hereby incorporated by reference herein and provides analysis and sample results for the probability of detection under conditions of interference-plus-noise covariance matrix mismatch for OS-CFAR and CA-CFAR detectors.

FIG. 1 is a block diagram of the radar detection system, in accordance with the disclosure. Radar detection system 102 may include one or more processors 110, a memory 120, a transmitter 130, one or more antennas 132, signal processing circuitry 134, a display device 136 and a receiver 142. Memory 120 may be communicatively coupled to the one or more processors 110. The one or more processors 110 may include one or more central processing units (CPUs), digital signal processors (DSPs), application specific integrated circuits (ASICs), field programmable gate arrays (FPGAs), or other circuitry configured to operate in accordance with aspects of the present disclosure. The transmitter 130 may be configured to transmit radar waveforms. The one or more antennas 132 may be configured to receive reflections or echoes of the transmitted radar waveform. These reflections may be processed in signal processing circuitry 134 and receiver 142.

Signal processing circuitry 134 may include various signal processing components, such as amplifiers, analog-to-digital converters, phase locked loops, mixers, a detector, a diplexer, gain control circuitry, low noise amplifiers (LNAs), other types of signal processing circuitry, or a combination thereof. It is noted that the exemplary types of signal processing circuitry described above have been provided for purposes of illustration, rather than by way of limitation and that the specific components of a radar detection system configured in accordance with the present disclosure may include less signal processing components, more signal processing components, or different signal processing components depending on the particular configuration or design of the radar detection system. Display device 136 may be configured to display information, such as range and speed, derived from the received reflections of the radar waveforms, such as to display information associated a target of interest.

As shown in FIG. 1, the memory 120 may store instructions 122 that, when executed by the one or more processors 110, cause the one or more processors 110 to perform operations for generating composite radar and communication waveforms in accordance with the present disclosure. For example, the instructions 122 may correspond to software that, when executed by the one or more processors 110, causes the one or more processors 110 to generate radar waveforms and to detect target reflections contained therein. Memory 120 may also store data 144.

Output radar emission 104 may be suitable for performing radar detection operations with respect to one or more targets of interest. For example, the output radar emission 104 may be reflected by the one or more targets of interest such as 140, and the reflections may be received as echoes 106 at the one or more antennas 132. Signal processing circuitry 134 and receiver 142 may be configured to process the received echoes 106 to facilitate radar detection operations with respect to the one or more targets of interest, such as detecting and/or tracking a target of interest 140.

While aspects of the techniques described below are suitable for implementation via software, it should be understood that the approaches may be readily implemented in hardware if desired. Accordingly, the present disclosure is not to be limited to software implementations.

Figure 2:
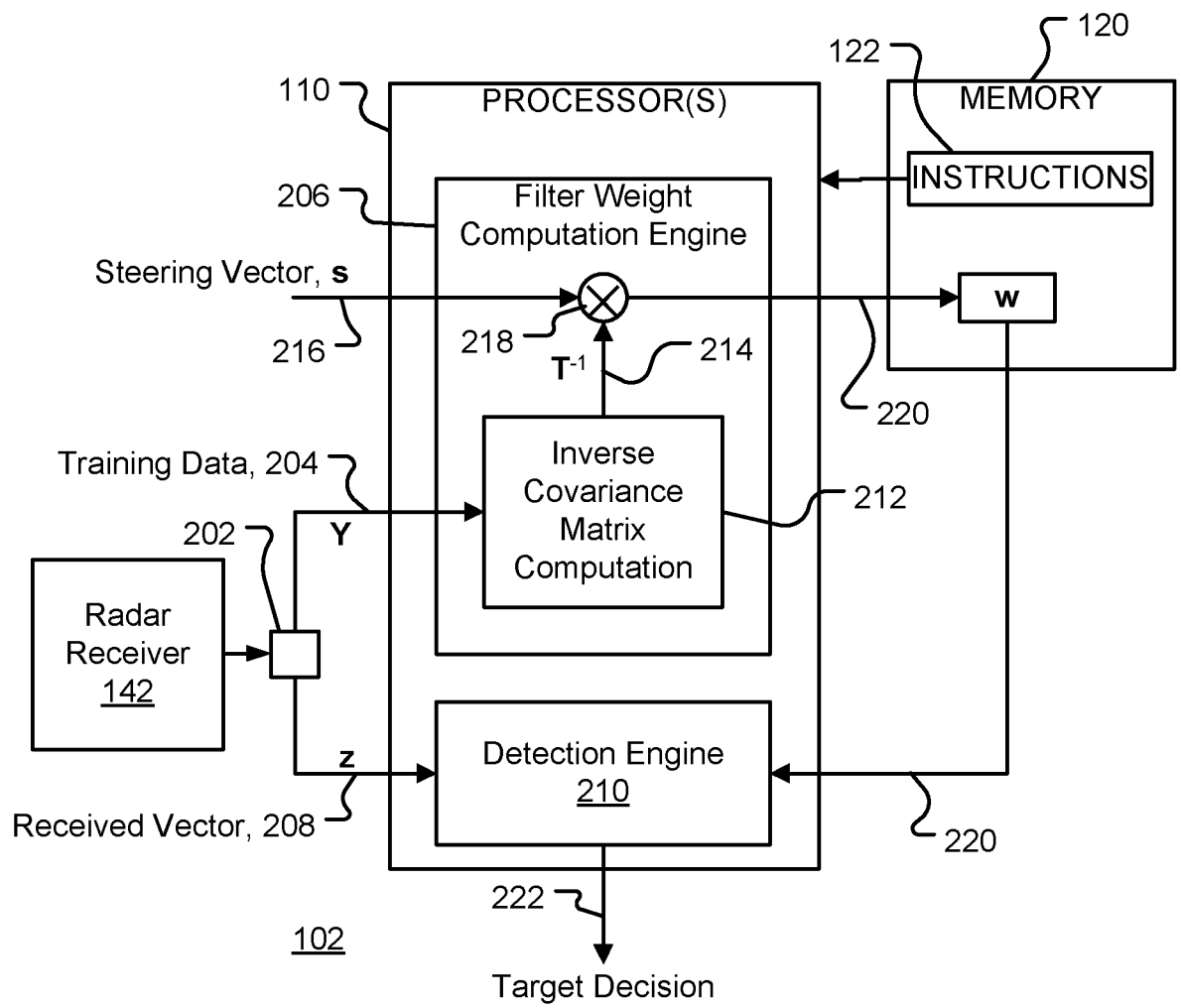
FIG. 2-3 illustrate a robust radar detection system, in accordance with a representative embodiment.

FIG. 2 illustrates a robust radar detection system 102, in accordance with a representative embodiment. In operation, radar receiver 142 receives a radar signal, via an antenna and signal processing circuitry for example, and supplies the signal to switch 202. During a training period, the received signal is down-converted and sampled and passed as training data 204 (denoted by data matrix Y) to filter weight computation engine 206, which is configured to generate filter weights to be used during a subsequent time period for canceling or reducing interference and noise in a received signal. During the subsequent time period, the radar detection system 102 is configured to detect targets and the switch passes the received vector 208 (vector z) to detection engine 210, where z is obtained by down-converting and sampling the received radar signal.

During the training period, training data 204 is used to inverse covariance matrix computation block 212 to produce a signal transformation matrix 214, denoted as $T^{-1}$. In one embodiment, signal transformation matrix 214 is computed as proportional to the inverse covariance matrix of the training data Y, according to $$T^{-1} = (YY^H)^{-1}, \quad (1)$$

where the superscript 'H' denotes a conjugate transpose. Alternatively, the signal transformation matrix may be computed as a pseudo-inverse of the matrix $YY^H$. For example, an eigen decomposition of the matrix of training data is denoted as $$YY^H = U \operatorname{diag}\{d_0, d_1, \ldots, d_N\} U^H, \quad (2)$$

where U is a unitary matrix, 'diag' denotes a diagonal matrix formed from the arguments, and the eigenvalues do are ordered from largest to smallest. An example pseudo-inverse is given by $$T^{-1} = U \operatorname{diag}\{0, \ldots, 0, d_{n+1}^{-1}, d_{n+2}^{-1}, \ldots, d_N^{-1}\} U^H, \quad (3)$$

which is a projection onto a noise-only subspace of the training data. The projection reduces the dominant interference components.

The signal transformation matrix may be estimated by other means, such as a model of the interference and noise. An aspect of the disclosed detector is that the signal transformation matrix need not be matched with the inverse covariance matrix of the test vector.

For each hypothesis or steering vector 216 (s), the steering vector is multiplied by the transformation matrix in multiplier 218 to provide a weight vector 220 (w), according to $$w = T^{-1}s. \quad (4)$$

When a projection matrix, such as that given in equation (3), is used, the subspace is required to include the steering vector s. The weight vectors w, for each steering vector s, may be stored in memory 120 for later use.

During a subsequent detection period, detection engine 210 uses the weight vector 220 (w) and the received vector 208 (z) to provide a target decision as signal 222.

A feature of detection engine 210 is that the target decision 222 has a constant false alarm rate (CFAR), (i.e. a constant probability of false alarm) even when the transformation matrix 214 used in the computation of weight vector 220 is mismatched with the inverse covariance matrix of interference and noise in received vector 208. This is discussed in more detail below.

In one embodiment, a target is detected when $$|w^H z_0|^2 > \eta G\{(w^H Z) e (w^H Z)^H\}, \quad (5)$$

where $|w^H z_0|^2$ is a test power of the filtered (weighted) signal at a test cell, the symbol e denotes a Hadamard or Schur (element-by-element) product, $Z = \{z_1, z_2, \ldots, z_M\}$ is a matrix of current reference vectors $z_k$, $\eta$ is a threshold value, and the function G maps a vector quantity to a scalar value. The test cell corresponds to a hypothesized range and Doppler shift of a target. In turn, the hypothesized range corresponds to a hypothesized time-of-flight or lag for the received vector relative to the emitted radar signal. Similarly, each reference vector $z_k$ corresponds to a received vector at a given reference cell that, in turn, corresponds to a different range and/or Doppler shift.

For a set of M reference vectors, equation (5) can be written as $$|w^H z_0|^2 > \eta G(|w^H z_1|^2, |w^H z_2|^2, K, |w^H z_M|^2), \quad (6)$$

where $|w^H z_0|^2$ is a test power of the filtered (weighted) signal in the test cell and $G(|w^H z_1|^2, |w^H z_2|^2, K, |w^H z_M|^2)$ is a reference power computed from the filtered signal at M reference cells. In this approach there is no assumption that the signal transformation matrix $T^{-1}$ matches the inverse covariance matrix at the test lag. It is noted that the threshold value η and the function G may be scaled provided that the value of their product in equation (4) remains the same.

Equivalently, a target is detected when the ratio of test power to reference power is greater than the threshold, i.e.

$$\frac{|w^H z_0|^2}{G((w^H Z)e(w^H Z)^H)} > \eta. \quad (7)$$

A feature of the disclosed method is that the relationship between the threshold value η and the false alarm rate is known. As a result, the threshold value may be set to yield a desired false alarm rate.

In one embodiment, the function G is computed as $$G(|w^H z_1|^2, |w^H z_2|^2, K, |w^H z_M|^2) = \sum_{k=1}^{M} |w^H z_k|^2, \quad (8)$$

Figure 3:
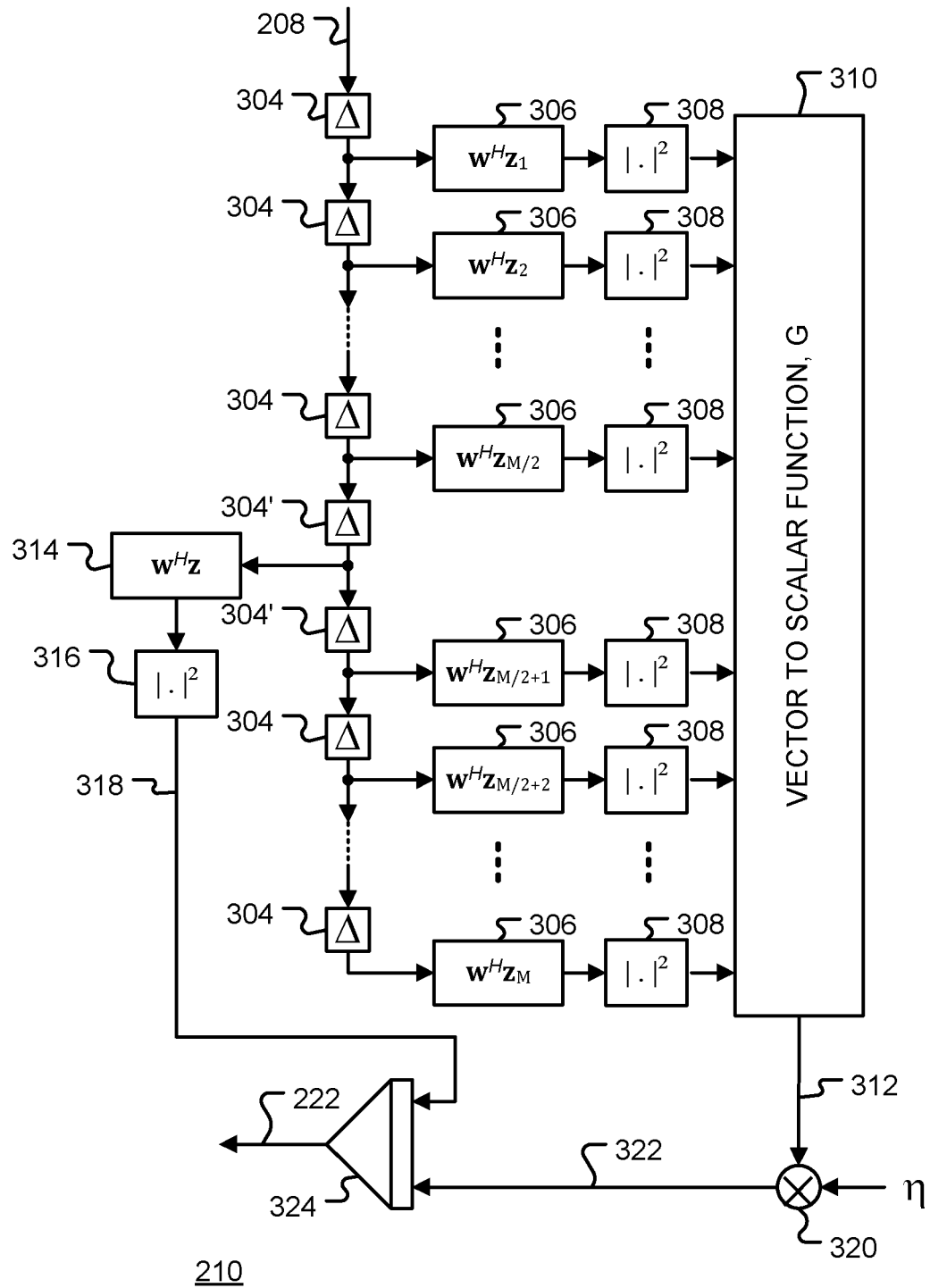

FIG. 3 is a block diagram of a detection engine 210 of CFAR radar detector in accordance with the disclosure. A received vector 208, after down-conversion to baseband and sampling, is input to detection engine 210 and through a series of delay elements 304, 304' to provide vectors at a number of different time lags. These time lags, relative to a time of transmission, correspond to different ranges to a target. The series of delay elements constitutes a data buffer and may be implemented as such. Delayed vectors to be used as reference vectors are multiplied by the weight vector w in block 306, and a magnitude-squared of the complex result is computed at block 308 to provide powers of the reference vectors. These powers are passed to vector-to-scalar unit 310 that is configured to implement the function G and provide reference power 312. The received vector in the test cell, which has been delayed by an amount corresponding to a hypothesized range, is multiplied by the weight vector in block 314 to provide a complex filtered signal and a magnitude-squared of the complex filtered signal is computed at block 316 to provide test power 318.

The reference power 312 is scaled by the threshold value η in multiplier 320 to provide scaled reference power 322. The scaled reference power 322 and the test power 318 are compared in comparator 324 to provide final decision signal 222. When the test power exceeds the scaled reference power, decision signal 22 indicates that a target is detected. Otherwise, the signal 222 indicates that no target is detected.

It is noted that the delay element 304 may have different values, in which case the reference vectors are taken from non-uniformly spaced time lags. For example, lags 304' may be greater than lags 304 to allow for situations where a target return is spread across several lags or cells.

Figure 4:
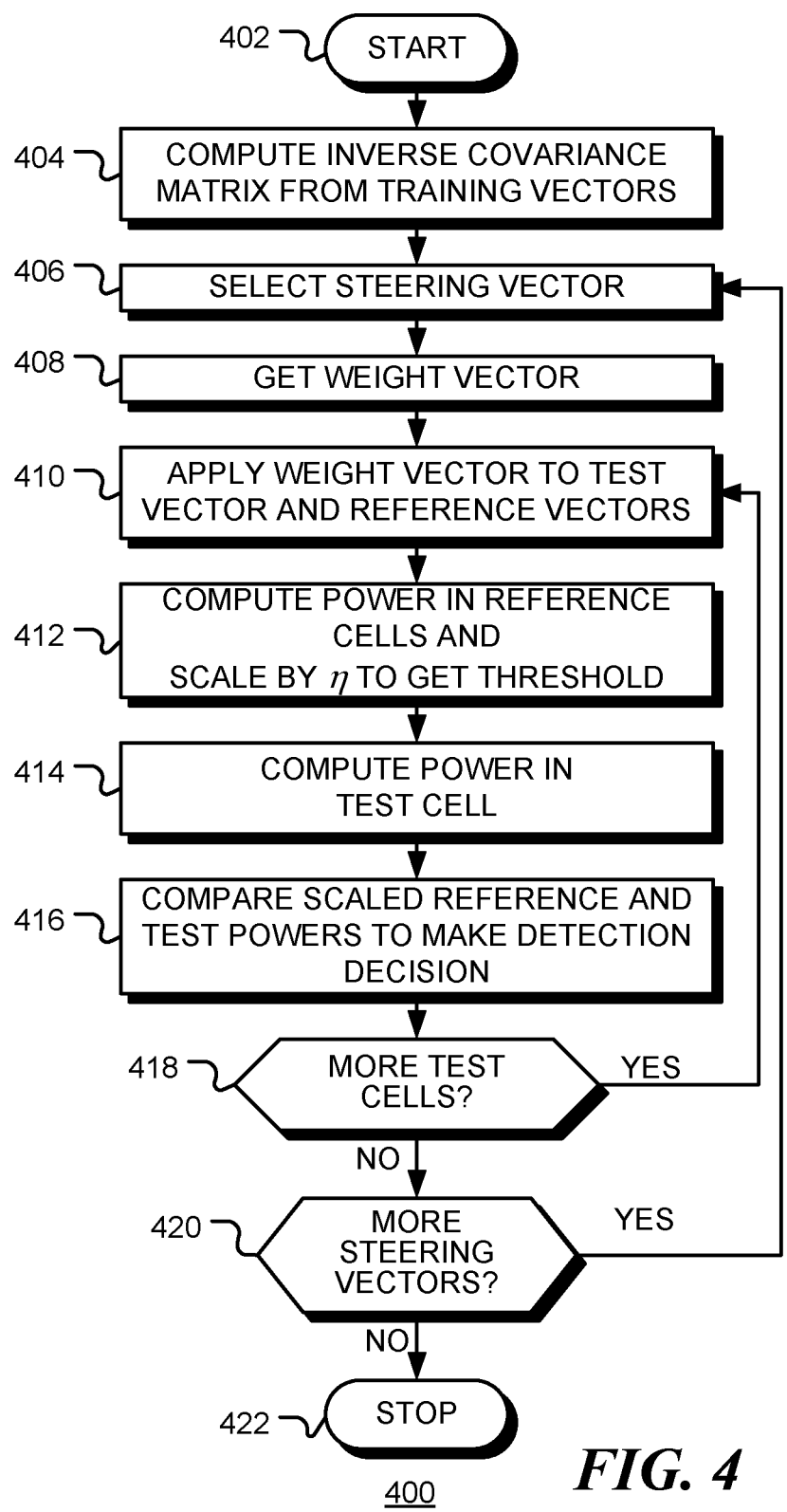
FIG. 4 is a flow chart of a robust method for radar detection, in accordance with a representative embodiment.

FIG. 4 is a flow chart of a method 400 for CFAR detection in accordance with the disclosure. Following start block 402, a signal transformation matrix is computed from training vectors at block 404. The training vectors may be collected during a period when no target is present, for example. The signal transformation matrix may be computed as the inverse covariance matrix of the training vectors, or a scaled version thereof. At block 406, a steering vector (s) is selected corresponding to an expected radar return when a target is present. The weight vector is retrieved at block 408. This may be done by applying signal transformation matrix to the steering vector. Alternatively, the weight vectors may be computed prior to detection, in which case the weight vectors may be indexed. At block 410, the weight vector is applied to a ranged gated (time gated) test vector, corresponding to a test range, and to reference vectors corresponding to other ranges. At block 412, a reference power is computed from the weighted reference vectors and scaled by a threshold value η and, at block 414, a test power is computed from the weighted test vector. The test power and scaled reference power are compared at block 416. A target is detected when the test power exceeds the scaled reference power. This process is repeated for each test range cell and for each steering vector. Thus, when all of the test range cells have been checked, as depicted by the negative branch from decision block 418, flow continues to decision block 420. Otherwise, as depicted by the positive branch from decision block 418, flow returns to block 410. When all steering vectors have been tested, as depicted by the negative branch from decision block 420, the process terminates at block 422. Otherwise, as depicted by positive branch from decision block 420, flow returns to block 406 to select the next steering vector.

The probability of false alarm ($P_{FA}$) is related to the threshold value η by the relation $$P_{FA} = \int_0^\infty f_{G(q)}(q\%\!H_0) \left[ \int_{\eta q\%}^\infty f(t | H_0, G(q) = q\%) dt \right] dq\%, \quad (9)$$

where $f_{G(q)}(q\% H_0)$ is the probability density function for the combined output $G(q) = q\%$ from the M reference cells, $f(t|H_0, G(q) = q\%)$ conditional probability density function of the scalar output t from the test cell. $H_0$ denotes the hypothesis that a target in present in the test cell. This expression can be used to select the threshold value η that provides a desired probability of false alarm.

In equation (9), the inner integral gives the probability that the test cell output t exceeds the threshold $\eta q\%$, conditioned on the hypothesis $H_0$ and the combined output from the M reference cells. The outer integral in equation (9) removes the conditioning G (q)=q̃, by averaging the conditional probability of false alarm over the probability density function of the output produced from the reference cells $f_{G(q)}(\tilde{q}|H_0)$ to obtain the overall probability of false alarm, without any conditioning.

Under the hypothesis $H_0$, the scalar output produced from each of the M reference cells has the same probability density function as the corresponding output of the test cell.

It is known that the sum of M statistically independent and identically distributed normal random variables is distributed as a central Chi-squared random variable with M complex degrees of freedom (i.e. 2M real degrees of freedom). Thus, for a cell averaging CFAR (CA-CFAR) implementation, which sums the M scalar outputs produced from the reference cells according to equation (8), the combined output from the reference has the probability density function $$f_{G(q)}(q\%\!H_0) = \frac{q\%^{M-1}}{\mu^M (M-1)!} e^{-q\%/\mu} \quad (10)$$

In this special case, the probability of false alarm $P_{FA}$ and threshold scaling factor η are related by $$P_{FA} = \frac{1}{(1+\eta)^M}. \quad (11)$$

This can be rearranged as $$\eta = (P_{FA})^{1/M} - 1. \quad (12)$$

This enables the threshold value $\eta$ to be set for a desired probability of false alarm.

In alternative embodiment, where a different function G is used in the CFAR implementation, a different probability density function would result, but the relationship between the probability of false alarm and threshold value may be derived in a similar manner. For example the function G may be implemented as order statistic (OS)-CFAR such as a median value.

Appendix C, titled 'Robust CFAR Detector for Interference-plus-noise Covariance Matrix Mismatch', is hereby incorporated by reference herein and provides a more detailed description of the detector.

The above systems, devices, methods, processes, and the like may be realized in hardware, software, or any combination of these suitable for a particular application. The hardware may include a general-purpose computer and/or dedicated computing device. This includes realization in one or more microprocessors, microcontrollers, embedded microcontrollers, programmable digital signal processors or other programmable devices or processing circuitry, along with internal and/or external memory. This may also, or instead, include one or more application specific integrated circuits, programmable gate arrays, programmable array logic components, or any other device or devices that may be configured to process electronic signals. It will further be appreciated that a realization of the processes or devices described above may include computer-executable code created using a structured programming language such as C, an object oriented programming language such as C++, or any other high-level or low-level programming language (including assembly languages, hardware description languages, and database programming languages and technologies) that may be stored, compiled, or executed to run on one of the above devices, as well as heterogeneous combinations of processors, processor architectures, or combinations of different hardware and software. In another implementation, the methods may be embodied in systems that perform the steps thereof, and may be distributed across devices in a number of ways. At the same time, processing may be distributed across devices such as the various systems described above, or all of the functionality may be integrated into a dedicated, standalone device or other hardware. In another implementation, means for performing the steps associated with the processes described above may include any of the hardware and/or software described above. All such permutations and combinations are intended to fall within the scope of the present disclosure.

Embodiments disclosed herein may include computer program products comprising computer-executable code or computer-usable code that, when executing on one or more computing devices, performs any and/or all of the steps thereof. The code may be stored in a non-transitory fashion in a computer memory, which may be a memory from which the program executes (such as random-access memory associated with a processor), or a storage device such as a disk drive, flash memory or any other optical, electromagnetic, magnetic, infrared or other device or combination of devices. In another implementation, any of the systems and methods described above may be embodied in any suitable transmission or propagation medium carrying computer-executable code and/or any inputs or outputs from same.

It will be appreciated that the devices, systems, and methods described above are set forth by way of example and not of limitation. Absent an explicit indication to the contrary, the disclosed steps may be modified, supplemented, omitted, and/or re-ordered without departing from the scope of this disclosure. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context.

The method steps of the implementations described herein are intended to include any suitable method of causing such method steps to be performed, consistent with the patentability of the following claims, unless a different meaning is expressly provided or otherwise clear from the context. So, for example performing the step of X includes any suitable method for causing another party such as a remote user, a remote processing resource (e.g., a server or cloud computer) or a machine to perform the step of X. Similarly, performing steps X, Y, and Z may include any method of directing or controlling any combination of such other individuals or resources to perform steps X, Y, and Z to obtain the benefit of such steps. Thus, method steps of the implementations described herein are intended to include any suitable method of causing one or more other parties or entities to perform the steps, consistent with the patentability of the following claims, unless a different meaning is expressly provided or otherwise clear from the context. Such parties or entities need not be under the direction or control of any other party or entity, and need not be located within a particular jurisdiction.

It should further be appreciated that the methods above are provided by way of example. Absent an explicit indication to the contrary, the disclosed steps may be modified, supplemented, omitted, and/or re-ordered without departing from the scope of this disclosure.

It will be appreciated that the methods and systems described above are set forth by way of example and not of limitation. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context. Thus, while particular embodiments have been shown and described, it will be apparent to those skilled in the art that various changes and modifications in form and details may be made therein without departing from the scope of this disclosure and are intended to form a part of the disclosure as defined by the following claims, which are to be interpreted in the broadest sense allowable by law.

The various representative embodiments, which have been described in detail herein, have been presented by way of example and not by way of limitation. It will be understood by those skilled in the art that various changes may be made in the form and details of the described embodiments resulting in equivalent embodiments that remain within the scope of the appended claims.

What is claimed is:

1. A radar system for detecting a target, where the target is detected with a specified probability of false alarm, the system comprising:

a filter weight computation engine configured to compute a vector of filter weights dependent upon a steering vector and a transformation matrix;

a memory for storing the vector of filter weights;

a filter configured to produce a filtered radar signal by applying the vector of filter weights to samples of a received radar signal; and a processor configured to:
compute a threshold value dependent upon the specified probability of false alarm;
compute a test power from a power of the filtered radar signal at a test cell corresponding to a test range;
compute a reference power from a power of the filtered radar signal at a plurality of reference cells other than the test cell; and
detect the radar target at the test range when a ratio of the test power to the reference power exceeds a threshold value.

2. The radar system of claim 1, where the vector of filter weights is computed as a product of the steering vector with a signal transformation matrix.

3. The radar system of claim 2, where the signal transformation matrix is computed as an inverse covariance matrix of a set of training vectors prior to the radar signal being received.

4. The radar system of claim 3, where the inverse covariance matrix of the set of training vectors is mismatched with an inverse covariance matrix of interference and noise in the test cell.

5. The radar system of claim 1, where the signal transformation matrix is independent of the received radar signal.

6. The radar system of claim 1, where the processor is configured to compute the reference power as a sum of the power of the filtered radar signal at the plurality of reference cells.

7. The radar system of claim 1, where the processor is configured to compute the reference power as an order statistic of the power of the filtered radar signal at the plurality of reference cells.

8. The radar system of claim 1, where the processor is configured to detect the radar target at the test cell when the ratio of the test power to the reference power exceeds the threshold value by:
scaling the reference power by the threshold value to provide a scaled reference power; and
detecting the radar target when the test power is greater than the scaled reference power.

* * * * *